(12) United States Patent
Deml et al.

(10) Patent No.: US 8,684,339 B2
(45) Date of Patent: Apr. 1, 2014

(54) CONTROL DEVICE TO REDUCE VIBRATION MOVEMENT ON A DEVICE VIBRATING UNDER SPRING FORCE

(75) Inventors: Johann Deml, Thanstein (DE); Andreas Vogl, Teublitz (DE)

(73) Assignee: Grammer AG, Amberg (DE)

(*) Notice: Subject to any disclaimer, the term of this patent is extended or adjusted under 35 U.S.C. 154(b) by 486 days.

(21) Appl. No.: 12/841,861

(22) Filed: Jul. 22, 2010

(65) Prior Publication Data

US 2011/0024958 A1    Feb. 3, 2011

(30) Foreign Application Priority Data

Jul. 28, 2009  (DE) .......................... 10 2009 035 074
Jul. 8, 2010   (DE) .......................... 10 2010 026 569

(51) Int. Cl.
*F16F 15/06* (2006.01)

(52) U.S. Cl.
USPC ...................... 267/140.11; 267/131; 248/588

(58) Field of Classification Search
USPC .................................................. 248/588, 419
See application file for complete search history.

(56) References Cited

U.S. PATENT DOCUMENTS

| | | | |
|---|---|---|---|
| 3,300,203 A | | 1/1967 | Carter et al. |
| 3,752,432 A | * | 8/1973 | Lowe ............................ 248/564 |
| 4,151,973 A | * | 5/1979 | Sedlock ........................ 248/576 |
| 4,213,594 A | * | 7/1980 | Pietsch et al. ................. 248/550 |
| 4,286,765 A | * | 9/1981 | Delgleize et al. ............. 248/573 |
| 4,350,317 A | * | 9/1982 | Aondetto ...................... 248/588 |
| 4,408,744 A | | 10/1983 | Thompson |
| 4,477,050 A | | 10/1984 | Thompson et al. |
| 4,573,657 A | * | 3/1986 | Sakamoto ..................... 248/575 |
| 4,645,169 A | * | 2/1987 | Mischer ........................ 248/550 |
| 4,679,760 A | | 7/1987 | Dotzler et al. |
| 4,684,100 A | * | 8/1987 | Grassl ........................... 248/550 |
| 4,729,539 A | * | 3/1988 | Nagata ......................... 248/575 |
| 4,784,434 A | | 11/1988 | Iwami |
| 4,856,763 A | * | 8/1989 | Brodersen et al. ............ 267/131 |
| 4,943,037 A | * | 7/1990 | Brodersen et al. ............ 267/131 |
| 5,058,852 A | * | 10/1991 | Meier et al. .................. 248/588 |
| 5,125,631 A | * | 6/1992 | Brodersen et al. ............ 267/131 |
| 5,211,369 A | * | 5/1993 | Hoerner ........................ 248/588 |
| 5,251,864 A | * | 10/1993 | Itou .............................. 248/588 |
| 5,364,060 A | | 11/1994 | Donovan et al. |

(Continued)

FOREIGN PATENT DOCUMENTS

DE   1 898 307 U   8/1964
DE   19 16 403 A1  10/1970

(Continued)

OTHER PUBLICATIONS

The First Office Action dated Mar. 29, 2012 for Chinese Patent Application No. 201010244916.3 and English translation.

(Continued)

*Primary Examiner* — Thomas Irvin
(74) *Attorney, Agent, or Firm* — Lathrop & Gage LLP (57) ABSTRACT

A control device is shown to reduce a vibration movement of a device vibrating under spring force with at least two mobile parts vibrating in relation to each other, wherein the parts are connected together by means of mobile connecting arms, at least one of the connecting arms is connected with a first spring element end of at least one spring element and between the parts is arranged at least one damping element.

12 Claims, 5 Drawing Sheets

(56) References Cited

U.S. PATENT DOCUMENTS

| | | | |
|---|---|---|---|
| 5,533,703 A * | 7/1996 | Grassl et al. | 248/550 |
| 5,582,385 A | 12/1996 | Boyle et al. | |
| 5,735,509 A * | 4/1998 | Gryp et al. | 267/131 |
| 5,794,911 A | 8/1998 | Hill | |
| 5,957,426 A * | 9/1999 | Brodersen | 248/588 |
| 5,967,604 A | 10/1999 | Yoshida et al. | |
| 6,340,201 B1 | 1/2002 | Higuchi | |
| 6,616,116 B1 * | 9/2003 | Rochau et al. | 248/564 |
| 7,044,553 B2 | 5/2006 | Ropp | |
| 7,152,839 B2 * | 12/2006 | Mullinix et al. | 248/421 |
| 7,185,867 B2 * | 3/2007 | Hill et al. | 248/421 |
| 7,712,836 B2 * | 5/2010 | Deml | 297/344.16 |
| 7,810,884 B2 | 10/2010 | Lorey et al. | |
| 7,942,248 B2 | 5/2011 | St. Clair et al. | |
| 8,118,287 B2 * | 2/2012 | Schordine | 267/131 |
| 8,439,334 B2 * | 5/2013 | Deml et al. | 267/140.11 |
| 2001/0035600 A1 * | 11/2001 | St. Clair | 267/131 |
| 2002/0011699 A1 * | 1/2002 | St.Clair | 267/131 |
| 2006/0278805 A1 * | 12/2006 | Haller | 248/588 |
| 2008/0088165 A1 * | 4/2008 | Deml | 297/344.12 |
| 2008/0197684 A1 * | 8/2008 | Ott et al. | 297/344.16 |
| 2009/0134595 A1 * | 5/2009 | Haller et al. | 280/124.157 |
| 2009/0184448 A1 | 7/2009 | Hiser | |
| 2009/0283944 A1 * | 11/2009 | Schordine | 267/140.11 |
| 2010/0052356 A1 | 3/2010 | Lewis, II | |
| 2010/0102493 A1 * | 4/2010 | Deml et al. | 267/140.11 |
| 2010/0117428 A1 | 5/2010 | Deml et al. | |
| 2011/0001033 A1 * | 1/2011 | Kohl et al. | 248/575 |
| 2011/0001342 A1 * | 1/2011 | Deml et al. | 297/338 |
| 2011/0226930 A1 * | 9/2011 | Enns et al. | 248/569 |
| 2011/0278894 A1 | 11/2011 | Lorey | |
| 2012/0025577 A1 * | 2/2012 | Kolb | 297/344.13 |
| 2012/0043798 A1 | 2/2012 | Haller et al. | |
| 2012/0049421 A1 | 3/2012 | Haller et al. | |
| 2012/0086159 A1 | 4/2012 | Kolb | |
| 2012/0090930 A1 | 4/2012 | Haller | |
| 2012/0091773 A1 | 4/2012 | Lorey | |
| 2012/0126592 A1 | 5/2012 | Kaessner et al. | |
| 2012/0153689 A1 | 6/2012 | Haller et al. | |
| 2012/0153695 A1 | 6/2012 | Haller et al. | |
| 2012/0187615 A1 | 7/2012 | Haller et al. | |

FOREIGN PATENT DOCUMENTS

| | | | | |
|---|---|---|---|---|
| DE | 28 06 247 C2 | 8/1979 | | |
| DE | 28 11 034 A1 | 9/1979 | | |
| DE | 28 51 129 A1 | 6/1980 | | |
| DE | 3242287 A1 * | 5/1984 | | A47C 3/025 |
| DE | 35 17 345 A1 | 11/1986 | | |
| DE | 38 24 272 A1 | 3/1990 | | |
| DE | 41 01 221 A1 | 7/1992 | | |
| DE | 696 06 732 T2 | 4/1995 | | |
| DE | 197 56 252 A1 | 7/1998 | | |
| DE | 603 20 456 T2 | 12/2002 | | |
| DE | 699 08 290 T2 | 5/2004 | | |
| DE | 10 2005 028 725 A1 | 1/2006 | | |
| DE | 10 2006 016 047 B3 | 4/2006 | | |
| DE | 10 2005 003 833 | 6/2006 | | |
| DE | 10 2005 011 856 B3 | 8/2006 | | |
| DE | 10 2007 030 467 A1 | 1/2009 | | |
| DE | 10 2008 0166685 B3 | 6/2009 | | |
| DE | 10 2008 010 719 A1 | 8/2009 | | |
| DE | 10 2008 045 492 A1 | 3/2010 | | |
| DE | 10 2008 052 960 A1 | 4/2010 | | |
| DE | 10 2008 056 200 A1 | 5/2010 | | |
| DE | 10 2009 020 034 A1 | 11/2010 | | |
| DE | 10 2009 040 010 A1 | 1/2011 | | |
| EP | 0 054 880 A1 | 12/1981 | | |
| EP | 0 054 947 A1 | 12/1981 | | |
| EP | 0 089 794 | 9/1983 | | |
| EP | 0 448 340 A2 | 9/1991 | | |
| EP | 0 739 766 | 10/1996 | | |
| EP | 1 035 258 | 9/2000 | | |
| EP | 2 420 404 | 2/2012 | | |
| GB | 1199577 | 7/1970 | | |
| GB | 2 014 522 | 8/1979 | | |
| JP | 2007 062 539 A | 3/2007 | | |
| WO | WO 2004/110808 | 12/2004 | | |

OTHER PUBLICATIONS

Search Report for European Patent Application No. 11177689.4, mailed Dec. 14, 2011.

Office Action for German Patent Application No. 10 2010 035 888.6 mailed Jun. 9, 2011.

Office Action for German patent application No. 10 2010 048 210.2, mailed Jul. 7, 2011.

Office Action for German patent application No. 10 2010 051 325.3, mailed Oct. 10, 2011.

Office Action for German Patent Application No. 10 2010 055 342.5, mailed Oct. 6, 2011.

Extended European Search Report for parallel European Patent Application No. 11 19 5031, mailed Apr. 5, 2012.

Office Action for German Patent Application No. 10 2010 055 344.1, mailed Oct. 5, 2011.

Extended European Search Report for parallel European Patent Application No. 11 19 5039, mailed Apr. 5, 2012.

Examination Report for German Patent Application No. 10 2011 009 530.6 dated May 4, 2012.

Examination Report dated Aug. 24, 2012, from the German Patent Office for German Patent Application No. 10 2010 026 569.1.

* cited by examiner

CONTROL DEVICE TO REDUCE VIBRATION MOVEMENT ON A DEVICE VIBRATING UNDER SPRING FORCE

The invention concerns a control device to reduce a vibration movement of a device vibrating under spring force with at least two mobile parts vibrating relative to each other, wherein the parts are connected together by means of mobile connecting arms, at least one of the connecting arms is connected with a first spring element end of at least one spring element and between the parts is arranged at least one damping element, according to the preamble of claim 1. Furthermore a vehicle seat with such a control device is disclosed.

Conventionally in the vehicle sector, two mobile vehicle parts vibrating relative to each other such as for example a seat part of a vehicle seat which is arranged springing in relation to a vehicle seat lower part, have a spring element and an additional damping element in the form of a damper to absorb energy from the suspension system and damp out the spring movements if great deflections of this spring vibrating system are caused in the case of resonance.

The structure of such a damper can vary. For example hydraulic dampers essentially comprise a piston guided on a piston rod in an oil-filled cylinder. On axial movement of the piston rod and hence the piston relative to the cylinder, the oil must flow through narrow channels and valves in the piston. The resistance meeting the oil generates pressure differences which create the damping forces via active surfaces. As the speed of the piston movement increases, the flow resistance rises and hence the damping effect, wherein this characteristic can be influenced in a targeted manner within certain limits.

Mechanical dampers are also known. These comprise in principle spring-loaded friction surfaces. Layered leaf springs have several spring leaves and constitute combined spring/damper units. The flexion of the spring absorbs the impact and stores it in the spring. The friction between the individual spring leaves damps the vibration and converts part of the spring force into heat.

Also air spring dampers are known in which the medium air can perform the task of both the spring and the damper.

More frequently, such an arrangement of a damper, for example in a vehicle seat or between a driver's cab and a vehicle chassis, requires a more complex structure in order to obtain optimum damping of vibrations in different directions and of different strengths. A precise tuning is required between the damping and the springing properties which for example allow a seating comfort range within a spring travel-force curve of a vibrating vehicle seat. In addition these damper systems have the disadvantage that they reduce the vibration attenuation in the sub- and super-critical ranges and hence cause a deterioration in vibration comfort.

Consequently the object of the invention is to provide a control device to reduce vibrations in a vibrating device under spring force, preferably from the vehicle sector, which allows optimised damping and springing of the parts vibrating in relation to each other under the application of external forces or impacts of different strengths on the vibrating device. An increased seat comfort should be provided in the case of use of the device for a vehicle seat.

This object is achieved by the features of claim 1 and with reference to the application on a vehicle seat according to the features of claim 12.

The core concept of the invention is that on a control device to reduce a vibration movement of a device vibrating under spring force with at least two mobile parts vibrating in relation to each other, wherein the parts are connected together by means of mobile connecting arms, at least one of the connecting arms is connected with a first spring element end of at least one spring element and between the parts is arranged at least one damping element, at least one link track element is arranged in or on which under a resulting vibration movement a guide element connected with the first spring element end and in contact with the first connecting arm is arranged mobile on a link track.

A movement sequence of the guide element can be modified by position-changeable curve elements at least partly deviating from the course of the link track and is therefore modifiable. Such a control device allows, in dependency of strength, intensity and speed of a vibration initiated into the vibrating device and hence in dependency of the speed with which the two parts are moved together or apart in a vibrating movement, different movement courses of the guide element which is connected with the spring element and hence different spring force-travel springing curves are obtained. This leads, in particular in the springing end zones of the vibrating device i.e. when the device in its vibrating state is shortly before the end stop on a compression movement of the parts or an expansion movement of the parts, the force-travel spring curve can be influenced greatly by means of the link track in order here for example to obtain a high counter-force rise in the springing end zones and hence prevent stopping of the parts in their stroke end zones.

The curve elements are preferably connected with the damping element and can be positioned differently in dependency of the momentary size of a damping force of the damping element which depends on the momentary vibration speed of the two parts mobile vibrating in relation to each other. This means that the stronger the movement of the damping element arranged between the two parts due to a vibration applied to the device, the more the curve elements which can influence the link track of the link track element change position and hence the link track is influenced to a varying extent. This can advantageously happen such that in particular in the springing end zones, an increased counter-force is generated at higher speeds from the course of the guide element which also influences the force of the spring element. Also in the course of the guide element the damping force is also influenced.

The curve elements are advantageously formed as at least two latch elements which can swivel about a swivel axis, wherein the latch elements have curve section tracks along which the guide element can be guided deviating from the link track course.

The latch elements can advantageously be swivelled differently by means of the damping force of the damping element which is constantly changed to varying extents and hence influenced by the vibration initiated in the device, and as a result their curve section tracks protrude to different extents into the link track. As a result the course of the guide element running within the link track is decisively influenced such that the course of the guide element deviates at least in places from the course of the link track. This leads to the spring element being deflected to a varying extent like the damping element. Where this influence by the curve section of the latch element takes place in the end zones of the link track and hence in the springing end zones, in these springing end zones in particular the spring force and the damping force can be influenced in response to the vibration applied.

To obtain a deflection of the latch element by means of the damping element, the damping element has at least one extending piston rod, at the end of which are attached at least two rod elements which are connected with at least two swivelable latch elements.

The latch elements can be adjusted in their swivel position by the retraction and extension of the piston rod. As a result the position of the latch elements is decisively determined by the state of retraction and extension of the piston rod of the damper element. The latch elements are exposed to resistance in their swivel movement with a swivel adjustment force so that the changing damping force, depending on the speed of the parts moving together or apart because of the vibration initiated, is less than, equal to or greater than the swivel adjustment force. This means that at low speeds of the vibrating parts moving together and apart, a slow adjustment of the piston rod within the damper element takes place. This leads to a slight damping force on the piston rod and the damping element. As a result because of the low damping force, the swivel adjustment force thereof is not exceeded and hence the latch elements are not adjusted.

However a high relative speed in the vibrating parts leads to a strong application of vibration onto the device from outside. Thus a high damping force of the damping element is generated in reaction. This leads to the swivel adjustment force of the latch element being exceeded by the damping force, and because of the connection between the piston rod of the damping element and the latch element, an adjustment of the latch elements takes place in a predeterminable swivel direction.

The swivel movement of the latch elements can be directed such that the latch elements with their curve section tracks in the vibration springing end zones of the vibrating device and hence in the outer or end zones of the link track element are swivelled into the link track such that the course of the guide element is determined no longer by the link track but by the latch elements. As a result the springing element and also the damping element in the vibration springing end zones are brought to a greater deflection track and as a result a stronger counter-force and springing energy dissipation is generated in the vibration springing end zones.

Thus a control or regulation of the vibration springing dependent on the vibration speed and the associated forces is achieved. The higher the counter-forces generated in the vibration end zones, the more a damping occurs of the vibration as a function of deflection because of the parts mounted vibrating in relation to each other starting from their centre position.

The control device according to the invention to reduce a vibration movement of vibrating devices exposed to spring force can be used preferably for spring-mounted vehicle seats with one lever seat part on the top and one seat part underneath or a seat frame lower part. Alternatively for vehicle cabs, springing in relation to a vehicle frame can be used or for a chassis suspension system of a tractor or any other vehicle. The control device according to the invention can be used both for systems or devices vibrating in the vertical direction by means of a scissors type frame and parallelogram frame connection between the two parts, and for a vibration springing in the horizontal direction, i.e. both in the longitudinal and in the transverse direction in relation to the direction of vehicle travel.

Advantageously with the control device according to the invention to reduce vibration, a travel control is performed by means of the link track element. The relative movement and relative speed between the one part and the other part is used to change a springing kinematic and hence a transfer function of a vibration to the vibrating device. By means of the control device the springing kinematics of the vibrating device are changed over the spring travel of the device such that a desired springing curve or force-travel springing curve is set.

Advantageously the link track for this has at least parts of a course of a force-travel vibration springing curve. Such a force-travel vibration springing curve in its course has a first region which has a slight first gradient.

For higher vibrations speeds for example on use of a vehicle seat in the off-road sector when driving over pot-holes, a second and a third region are provided in the springing end position zones which have a second and a third gradient steeper than the first.

Advantageously the second region and the third region of the vibration movement in the direction of the springing end positions at least partly have a shallower gradient than on a vibration movement in the opposite direction or returning to the centre position of the springing device.

The course of the vibration springing curve at low vibration speeds, for example when running over a carriageway with little surface roughness, can be the same both in a first region lying between the springing end zones and in a second region lying in one of the springing end zones and a third region which has the same gradient. As a result it is clear that in the end position zones no change of springing force and hence no increased counter-force is generated. This has the consequence that a high seating comfort is obtained at slow speeds. Here the force applied to the device is so slight that the latch elements are not deflected and hence a straight, very flat seat spring curve results (force-travel curve).

At high relative speeds of the sides moving towards each other, a high seating comfort is also achieved in that an increase counter-force is obtained in the end springing end position zones is achieved because of the swivelling latch elements.

On use of a control device according to the invention to reduce the vibration movement on vehicle seats, this can be used for both mechanically operated and pneumatically operated vehicle seat systems. This refers to the bellows-foot shift of for example an air spring which can be used instead of a mechanical spring.

According to a preferred embodiment the spring element in the region of the part lying on the top in relation to the other is arranged almost horizontal and connected with the guide element and indirectly with the first end of the connecting arm and with the second end with the top part.

Further advantageous embodiment arise from the sub-claims in connection with the description and the drawings.

Figure 1:
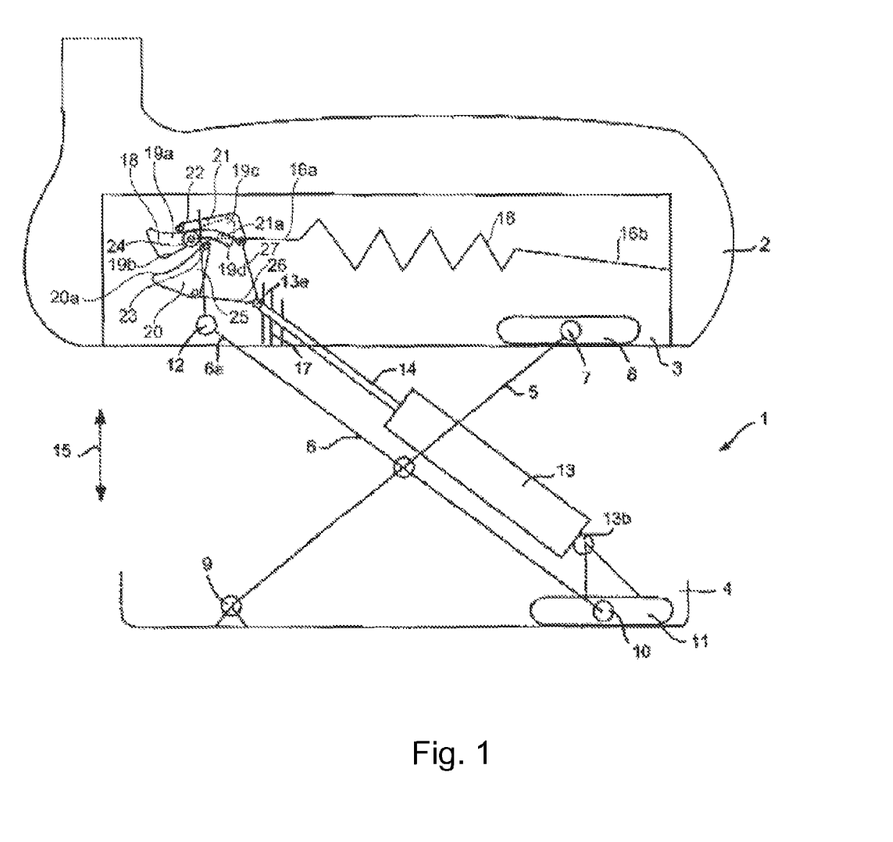
FIG. 1 in a first diagrammatic view a section of a vehicle seat with a control device according to the invention according to one embodiment of the invention.

Advantages and suitable applications are shown in the description below in conjunction with the drawings. These show:

FIG. 1 shows in a diagrammatic view the control device according to the invention for reducing vibrations in parts vibrating in relation to each other under spring loading. In this case this is the subframe of a vehicle seat 1 which is fitted with a cushion 2.

A part lying on top is mobile vibrating in relation to the seat frame lower part 4 underneath as shown by the double arrow with reference numeral 15.

Between the two parts 3 and 4 are arranged two scissor arms 5, 6 that are connected together. The scissor arms 5, 6 in their end zones have a roller-like mounting 7, 10, wherein here the rollers can be moved within guide rails 8, 11 as a function of the momentary vibration position of the scissor arms.

The other end of the scissor arm 5 is attached at the bottom with a swivel mounting 9 on the seat frame lower part 4.

The other end 6*a* of the scissor arm 6 however is connected via a swivel mounting 12 with a lever 25 which is preferably arranged at a fixed angle to the scissor arm 6. Both parts namely the both the lever 25 and the scissor arm 6 can rotate about the swivel axis 12 at a fixed angle to each other. This occurs in particular when the scissor arm 6 is deflected to a greater or lesser extent because of a vibration movement.

A damping element 13 is connected by a lower end 13*b* with the seat frame lower part 4 and by its upper end 13*a* that is arranged on an extendable piston rod 14 which in turn can be moved via a mounting 17 attached in the seat upper part 3, with rod elements 26, 27. The rod elements 26, 27 can be swivelled to different extents as in dependency of the retracted and extended state of the piston rod 14 of the damper element 13 as shown from a comparison of FIGS. 1, 2 and 3.

A springing element 16 is connected almost horizontally by a first end 16*a* with a guide element 24 and hence indirectly also with the lever arm 25 that is in contact with the guide element 24 and can deflect this. The springing element 16 which can also be formed as an air spring is connected by a further or second end 16*b* on the right side with the upper seat part 3. The end of the springing element 16*a* can be deflected to a varying extent depending on the position or location of the guide element 24.

The guide element 24 is moved within or on a link track element 18 and can run through various link track sections 19*a*, 19*b*, 19*c* and 19*d* or slide along their curve tracks.

Latch elements which can be swivelled about swivel axes 22, 23 and are mounted swivelably thereon have curve sections 20*a* and 21*a* which can be swivelled in to varying extents by swivelling the latch elements in the region of the link track element 18 and as a result can decisively influence the movement course of the guide element 24 in particular in the right-sided and left-sided end zones of the link track element 18. This is clear from a comparison of the views in FIGS. 2 and 3.

Figure 2:
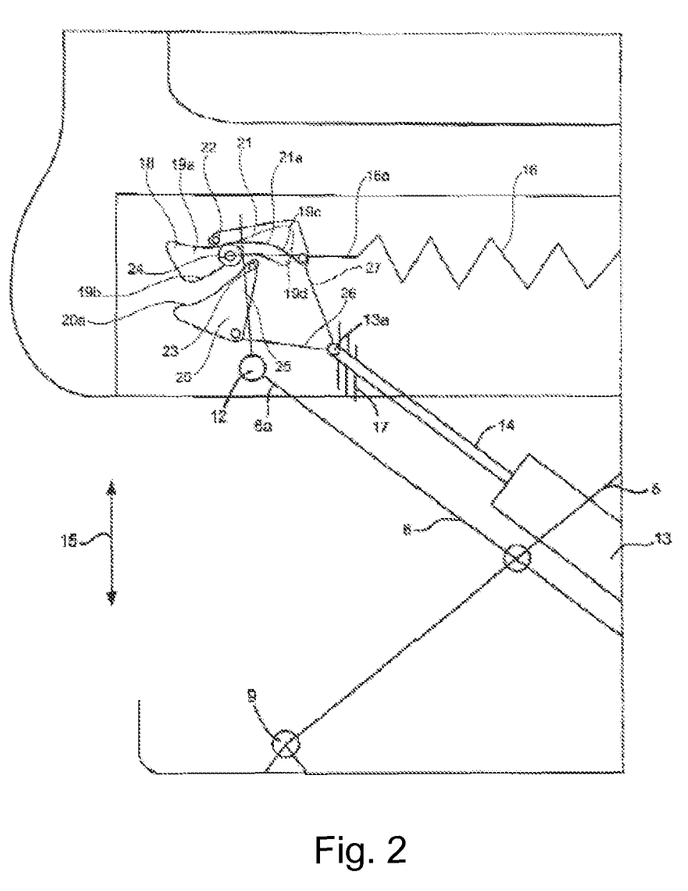
FIG. 2 in a diagrammatic view a section of the control device shown in FIG. 1 in a first state.
Figure 3:
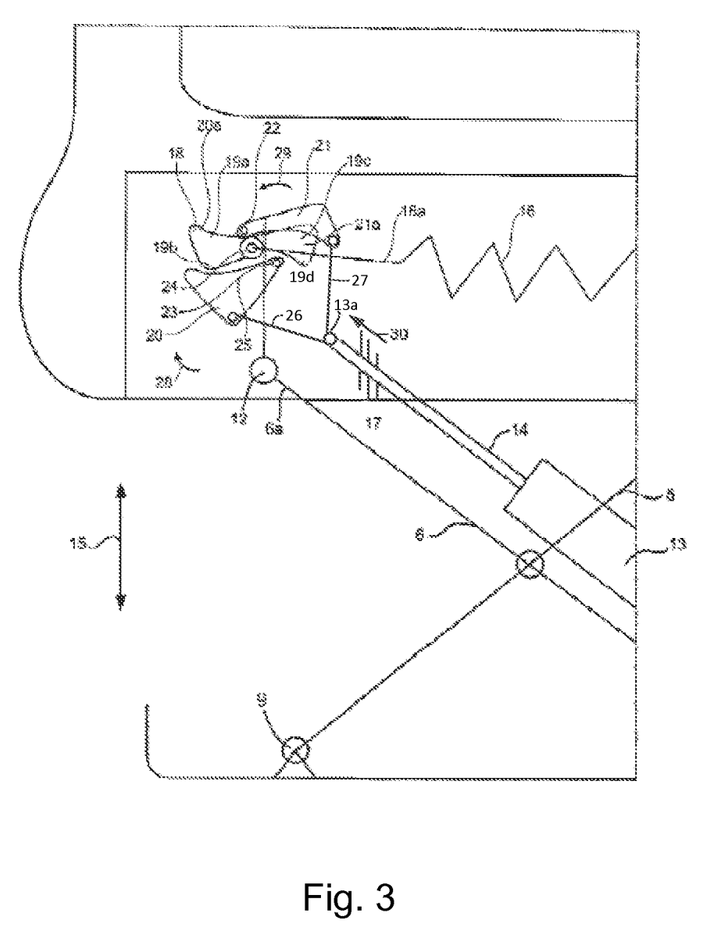
FIG. 3 in a diagrammatic view a section of the control device shown in FIG. 1 in a second state.

As now appears on comparison of the section views according to FIGS. 2 and 3, the piston rod 14 of the damping element can have different shift positions as a function of whether or not a high relative speed occurs of the parts 3 and 4 moving towards each other. This depends decisively on the strength of application of an external vibration onto the vibrating device.

If the piston rod 14 is deflected more as a result and moved up, as shown from FIG. 3 with reference numeral 30, the rod elements 26, 27 are swivelled and as a result a swivel 28, 29 of the latch elements occurs. This has the consequence that the guide element 24 moving to the left is guided along a curve track section 20*a* of the latch element and not along a curve track section 19*b* of the link track element 18. As a result a greater deflection occurs of the guide element in the direction of the curve track section 20*a* and hence a stronger deflection of the end of the spring element 16. This has the consequence that an increased counter-force is generated in a vibration springing end zone and hence a speed-dependent springing-damping strength can be attained.

Figure 4:
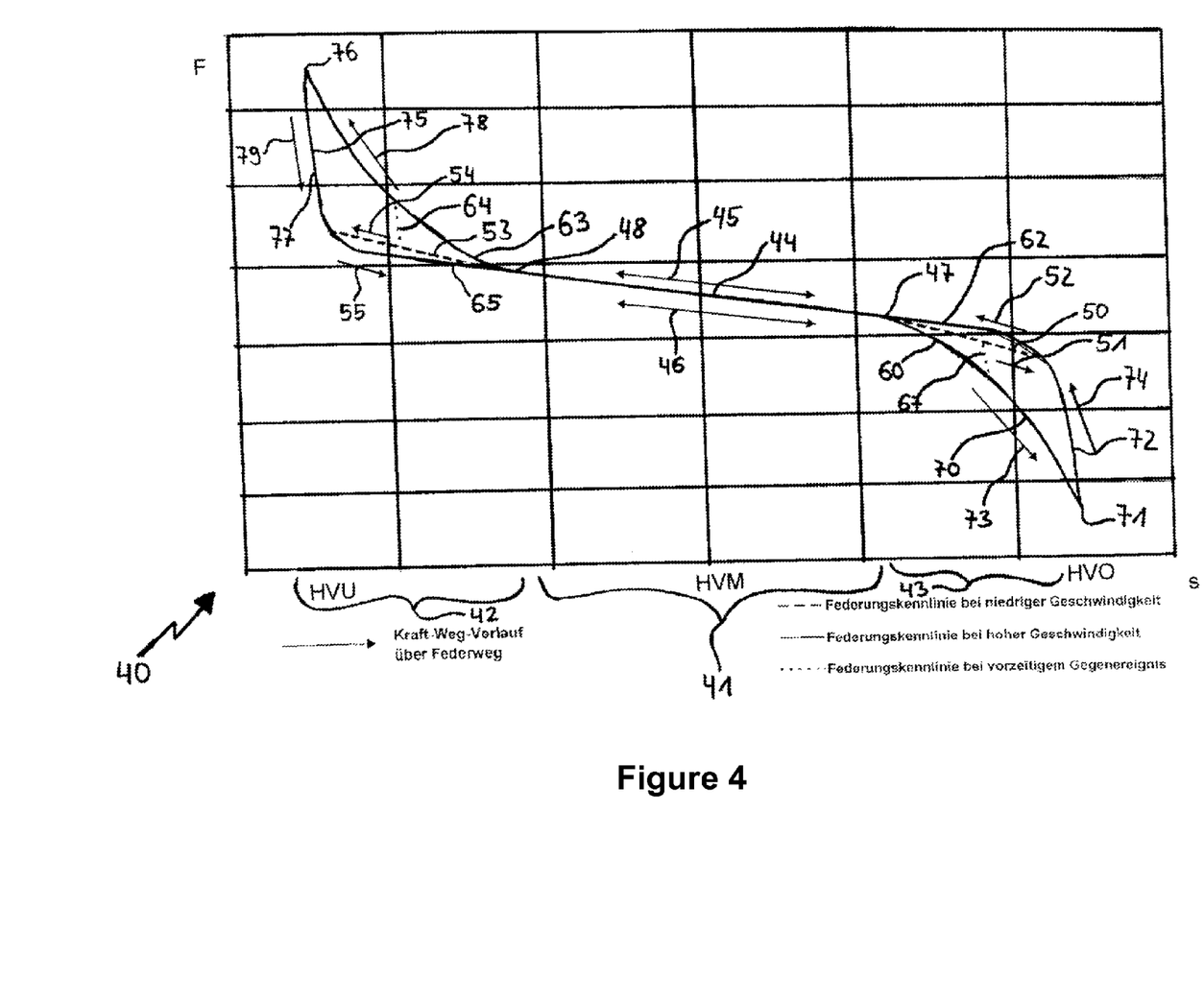
FIG. 4 in a diagram the course of the force-travel vibration springing curve for vibrating devices with different speeds relative to each other.

FIG. 4 shows a diagram of the course of a force-travel spring curve for a total of three different relative speeds of the parts vibrating in relation to each other preferably for use on a vehicle seat. This diagram shows that the force-travel curve 40 has a first region 41 in which the vibration springing curve has a slight gradient in relation to the horizontal.

Both for a downward height displacement of the vibrating device and for an upward height displacement, a course of the vibration springing occurs on curve 44 with the control device according to the invention. This is shown by reference numerals 45 and 46.

From a particular point 47, 48, depending on the relative speed of the parts moving towards each other, a change in the curve may or may not occur. Insofar as the damping force as already described is lower than the latch adjustment force, i.e. there is a slight relative speed of the two systems vibrating in relation to each other, both for the downward moving and for the upward moving vehicle seat and hence the upper part 3 in relation to the lower part 4, there is no change in the gradient of the springing curve. This is clear from reference numerals 50 and 53. A movement away is depicted by reference numerals 51 and 54 and a movement back by reference numerals 52 and 55 in regard to the deflection of the upper part 3 in relation to a centre position in region 41.

The second 42 and third region 43 lying beyond points 47 and 48 differ from each other in that region 42 is a downward moving vehicle seat and region 43 is an upward moving vehicle seat.

Such a general movement of the vehicle seat described as compression and expansion, with the control device according to the invention, leads to different force characteristics in dependency of the relative speed of the two parts moving and vibrating in relation to each other.

At slow speeds the flat springing curve does not change in the second and third regions 42, 43 and a low kinematic energy level predominates which in conjunction with a flat curve leads to an improvement in seat comfort. Because of the slight deflection of the end 13*a* of the damping element 13 (low damping force) there is no deflection of latch elements.

Thus even at low relative speeds in the end zones there is no change in springing curve 50, 53. Rather there is only a slight increase in force and hence a slight acceleration for example of the seat upper part (driver mass), which gives a better and hence lower SEAT value of the device.

The dotted spring curves 60, 61 and 62 for an upwardly directed height adjustment of the vehicle seat and 63, 64, 65 for a downwardly directed adjustment of the vehicle seat concern a vibration state of the two parts vibrating in relation to each other in which, for a vibration which is already taking place, before performing the entire vibration, a counter-vibration occurs prematurely. This can be achieved for example in that after passing over a pot-hole, a bump is passed, and hence a counter-vibration applied from the outside to the vehicle seat. This leads to premature interruption of the momentary upward or downward movement of the vibrating vehicle seat. This has the consequence that the guide element 24 runs up to a particular section of the link track and then is brought to the return track. This is clear from reference numerals 64 and 61.

The third vibration spring curve arises at a very high relative speed of the two parts vibrating in relation to each other. The damper force here greatly exceeds the swivel adjustment forces of the latch elements and brings the latch elements completely to their end swivel positions. This has the consequence that the spring curve has a course which is shown through reference numerals 70, 71 and 72, and 75, 76 and 77. Arrows 73 and 74, and 78 and 79 show the direction of the course.

Figure 5:
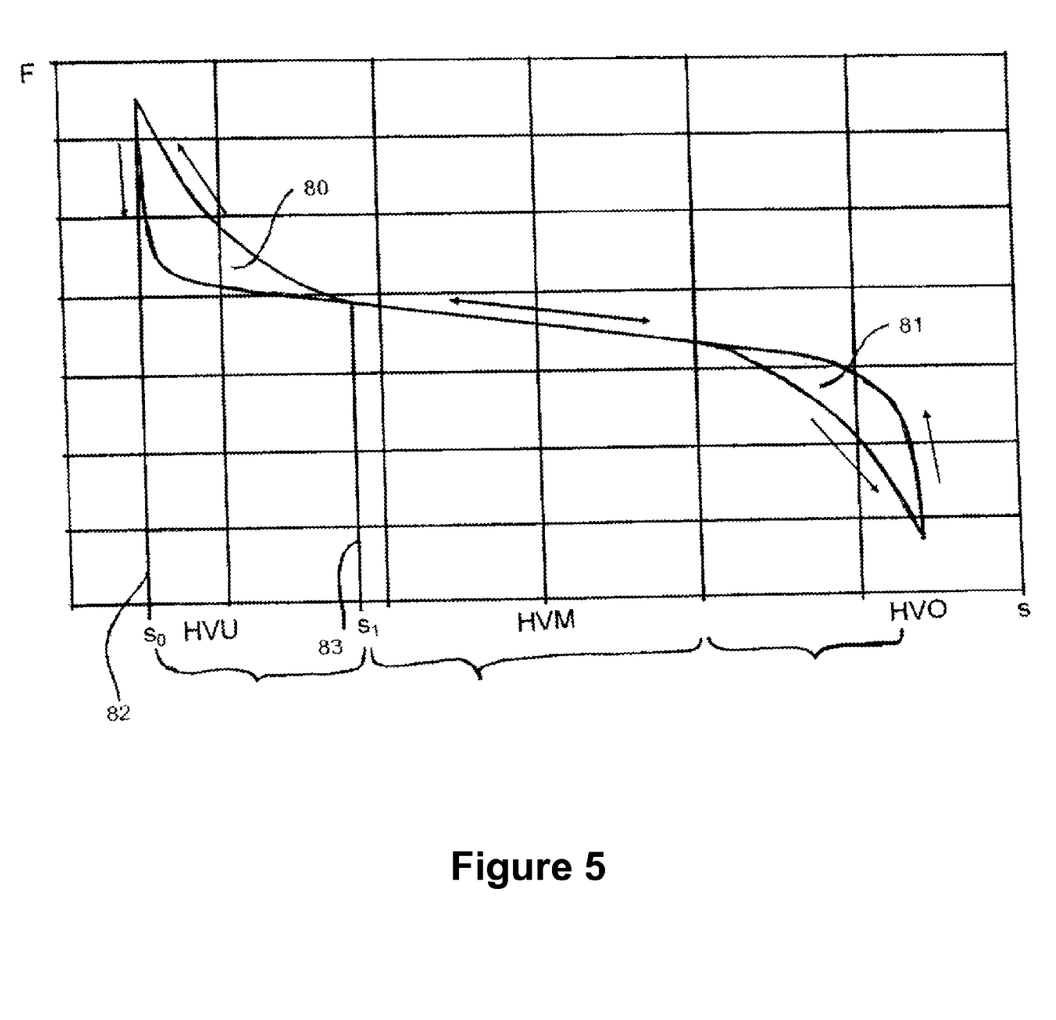
FIG. 5 in a diagram the course of the force-travel vibration springing curve for vibrating devices at a specific relative speed.

It is clear from this course of the spring curve in regions 42 and 43 that on the outward movement i.e. in the direction of the spring end position zones, a lower gradient 70, 75 is evident in the curve than after the turning point 71, 76 during the return movement 72, 77 in the direction of the centre position in region 41. This shows that the maximum kinematic change is achieved, as is also clear from a comparison with the diagram shown in FIG. 5. FIG. 5 shows in the regions 80, 81 an area which occurs by integration over the extent by means of the starting point 82 and end point 83 and the force difference. On the return movement 72, 77 previously there was a release of the latch element or withdrawal out of the movement direction of the guide element 24. This led to the sudden fall in the spring curve or force-travel curve in regions 72, 77.

Such an integration area reflects the energy extracted from the system and thus clarifies that because of a kinematic change, the relative speed between the parts diminishes greatly purely because of the energy extraction.

Thus advantageously a vibrating device with a control device is achieved which has less vibration energy in the springing end zones at high relative speed of the two parts vibrating in relation to each other than in the centre region. This leads to the vibration in the springing end zones diminishing substantially because of the lower energy and hence a higher seat comfort being achieved as the end stops of damping elements and similar are not reached.

All features disclosed in the application documents are claimed as essential to the invention if novel individually or in combination in relation to the prior art.

REFERENCE LIST

1 Device
3 Seat upper part
15 Control device
3, 4 Mobile parts, seat frame lower part
5, 6 Mobile connecting arms, scissor arms
9 Swivel bearing
7, 10 Bearing
8, 11 Guide rails
12 Swivel bearing
13 Damping element
13a, 13b End of damping element
14 Piston rod
16 Spring element
16a Spring element end
17 Bearing
18 Link track element
19a-19d Link track
20, 21 Curve elements
20, 20a Curve sections
22, 23 Swivel axes
24 Guide element
25 Lever arm
26, 27 Rod elements
28, 29 Swivelling
40 Force-travel spring curve
41 First region
42, 43 Third region
44 Curve
52, 55 Return travel
60-65 Springing curve
73, 74, 78, 79 Arrows 70, 75 Curve
71, 76 Turning point
72, 77 Return movement
80, 81 Area
82 Starting point
83 End point

The invention claimed is:

1. A control device to reduce a vibration movement (15) on a device (1) vibrating under spring force with at least two mobile parts (3, 4) vibrating in relation to each other, wherein the parts (3, 4) are connected together by means of mobile connecting arms (5, 6), at least one of the connecting arms (6) is connected at least indirectly with a first spring element end (16a) of at least one spring element (16) and between the parts (3, 4) is arranged at least one damping element (13), characterised in that at least one link track element (18), in or on which under a vibration movement (15) a guide element (24) connected with the first spring element end (16a) and in contact with the first connecting arm (6) is arranged mobile on a link track (19a-d), wherein a movement course of the guide element (24) can be modified by position-changeable curve elements (20, 21) to deviate at least in part from the curve of the link track (19a-19d).

2. The control device according to claim 1, characterised in that the curve elements (20, 21) are connected with the damping element (13) and can be positioned differently (28, 29) in dependency of the momentary size of a damping force of the damping element (13) which depends on a momentary vibration speed of the two mobile parts (3, 4) vibrating in relation to each other.

3. The control device according to claim 2, characterised in that the curve elements (20, 21) can swivel about a swivel axis (22, 23), wherein the curve elements (20, 21) have curve section tracks (20a, 21a) along which the guide element (24) can be guided deviating from the course of the link track (19a-d).

4. The control device according to claim 3, characterised in that the damping element (13) has at least one extendable piston rod (14), on the end (13a) of which are attached at least two rod elements (26, 27) that are connected with the at least two swivelable curve elements (20, 21), wherein the swivel position (28, 29) of the curve elements (20, 21) can be adjusted by extension and retraction of the piston rod (14).

5. The control device according to claim 3 or 4, characterised in that the curve elements (20, 21) are subject to resistance in their swivel movement (28, 29) from a swivel adjustment force.

6. The control device according to claim 5, characterised in that the changing damping force of the damping element (13) is less than, equal to or greater than the swivel adjustment force.

7. The control device according to claim 6, characterised in that the link track (19a-d) reflects at least part of a course of a force-travel vibration springing curve (44, 70-72, 75-77).

8. The control device according to claim 7, characterised in that the course of the vibration springing curve (44, 70-72, 75-77) has a first region (41) with a slight first gradient and for higher vibration speeds a second and third region (42, 43) arranged in the springing end position zones with a second and third gradient steeper than the first gradient.

9. The control device according to claim 8, characterised in that the second region (42) and the third region (43), on a vibration movement (15) in the direction (73, 78) of the springing end positions, have at least partly a shallower gradient (70, 75) than on the opposite vibration movement (74, 79).

10. The control device according to claim 7, characterised in that the course of the vibration springing curve (44, 50, 53) at low vibration speeds has the same gradient both in a first region (41) lying between the springing end position zones and in a second region (42) and third region (43) also lying in one of the springing end position zones.

11. The control device according to claim 1, characterised in that the spring element (16) in the region of the upper part (3) in relation to the other part (4) is arranged running almost horizontal and by the first end (16a) is connected with the guide element (24) and indirectly with the first end (6a) of the connecting arm (6) and by the second end (16b) with the top part (3).

12. The control device according to claim 1, characterised in that it is intended for a vehicle seat with a seat part on the top as a first part (3) and with a seat frame lower part underneath as the second part (4).

* * * * *